S. F. DOUGLASS.
DIRECTION INDICATOR FOR MOTOR VEHICLES.
APPLICATION FILED MAY 21, 1915.

1,165,949.

Patented Dec. 28, 1915.
3 SHEETS—SHEET 1.

Witnesses

Inventor
S. F. Douglass.
By
Attorney

S. F. DOUGLASS.
DIRECTION INDICATOR FOR MOTOR VEHICLES.
APPLICATION FILED MAY 21, 1915.
1,165,949.
Patented Dec. 28, 1915.
3 SHEETS—SHEET 2.
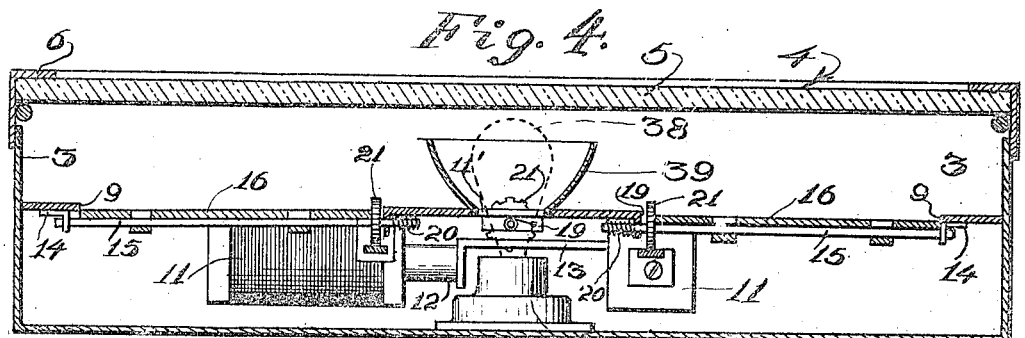
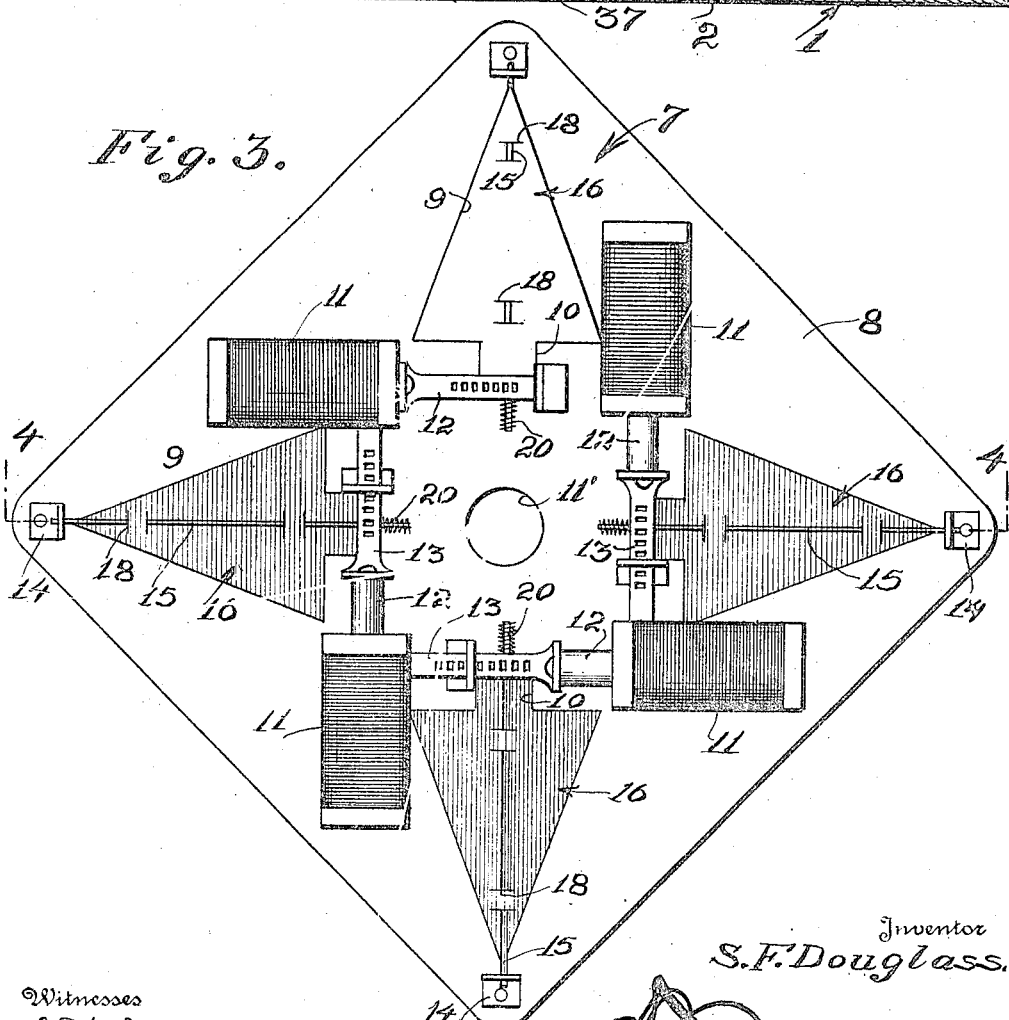

S. F. DOUGLASS.
DIRECTION INDICATOR FOR MOTOR VEHICLES.
APPLICATION FILED MAY 21, 1915.
1,165,949.
Patented Dec. 28, 1915.
3 SHEETS—SHEET 3.
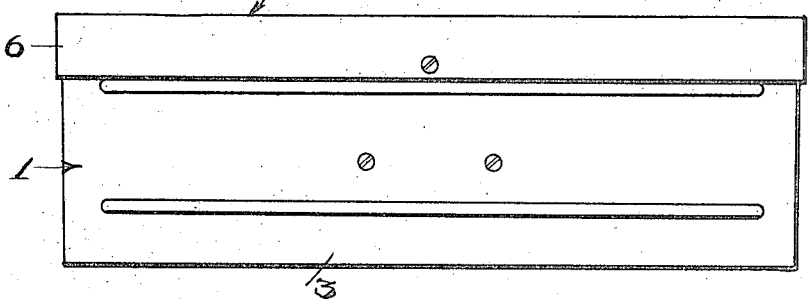
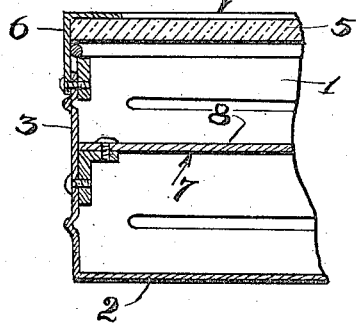
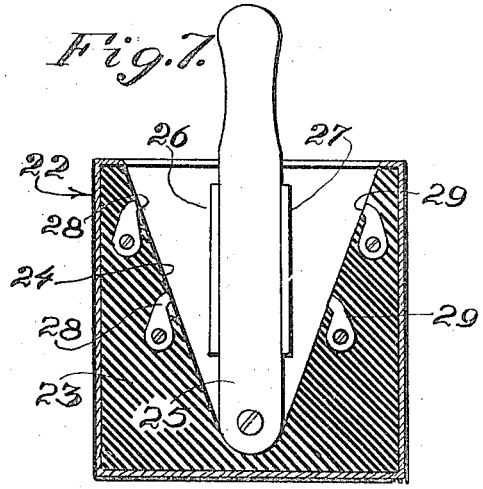
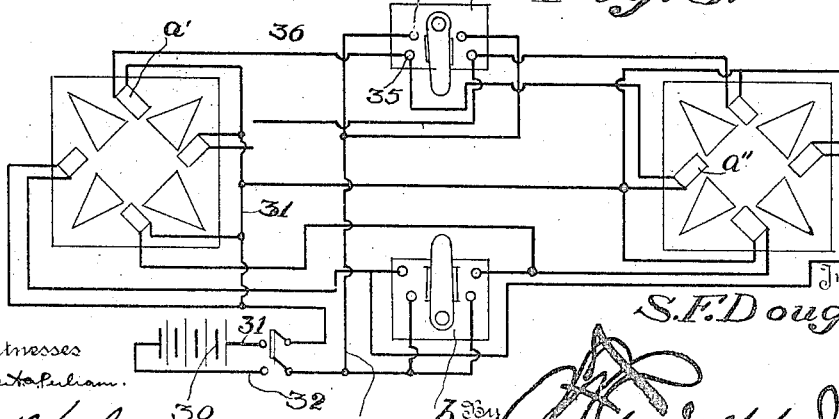
Inventor
S. F. Douglass
Witnesses
Attorney

UNITED STATES PATENT OFFICE.

SAMUEL F. DOUGLASS, OF PRAIRIE DU ROCHER, ILLINOIS, ASSIGNOR TO VEHICLE SIGNAL COMPANY, A CORPORATION OF ARIZONA.

DIRECTION-INDICATOR FOR MOTOR-VEHICLES.

1,165,949.  Specification of Letters Patent.  Patented Dec. 28, 1915.

Application filed May 21, 1915. Serial No. 29,586.

*To all whom it may concern:*

Be it known that I, SAMUEL F. DOUGLASS, a citizen of the United States of America, residing at Prairie du Rocher, in the county of Randolph and State of Illinois, have invented certain new and useful Improvements in Direction-Indicators for Motor-Vehicles; and I do hereby declare the following to be a full, clear, and exact description of the invention, such as will enable others skilled in the art to which it appertains to make and use the same.

This invention relates to new and useful improvements in direction indicators for motor vehicles, and the principal object of the invention is to provide a reliable and efficient means by which the driver of a motor vehicle may indicate the direction to be taken when turning corners and rounding curves and to give other information.

Another object of the invention is to provide a device which will save life and property and avoid danger of injury to both the occupants of the vehicle and pedestrians or others.

Still another object of the invention is to provide a direction indicator which may be controlled from the steering wheel of the vehicle, thereby avoiding the necessity of the operator removing his hands therefrom.

A further object of the invention is to provide a device which is visible, either in the day time or after night and in which it is possible to use the rear signals as a tail lamp by interposing a red screen between the light and the front plate of the indicator.

With these and other objects in view, the invention consists in the novel combination and arrangement of parts which will be fully set forth in the following specification and accompanying drawings, in which:—

Figure 1:
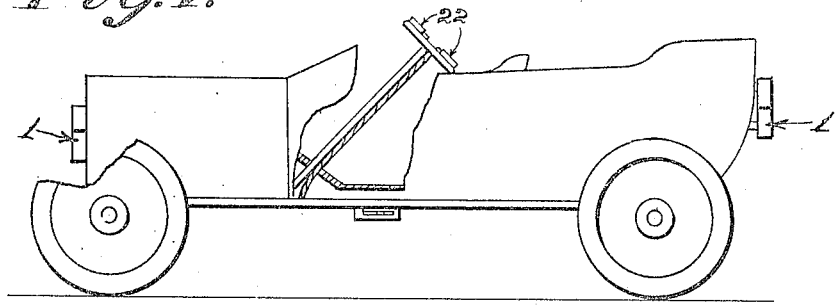
Figure 2:
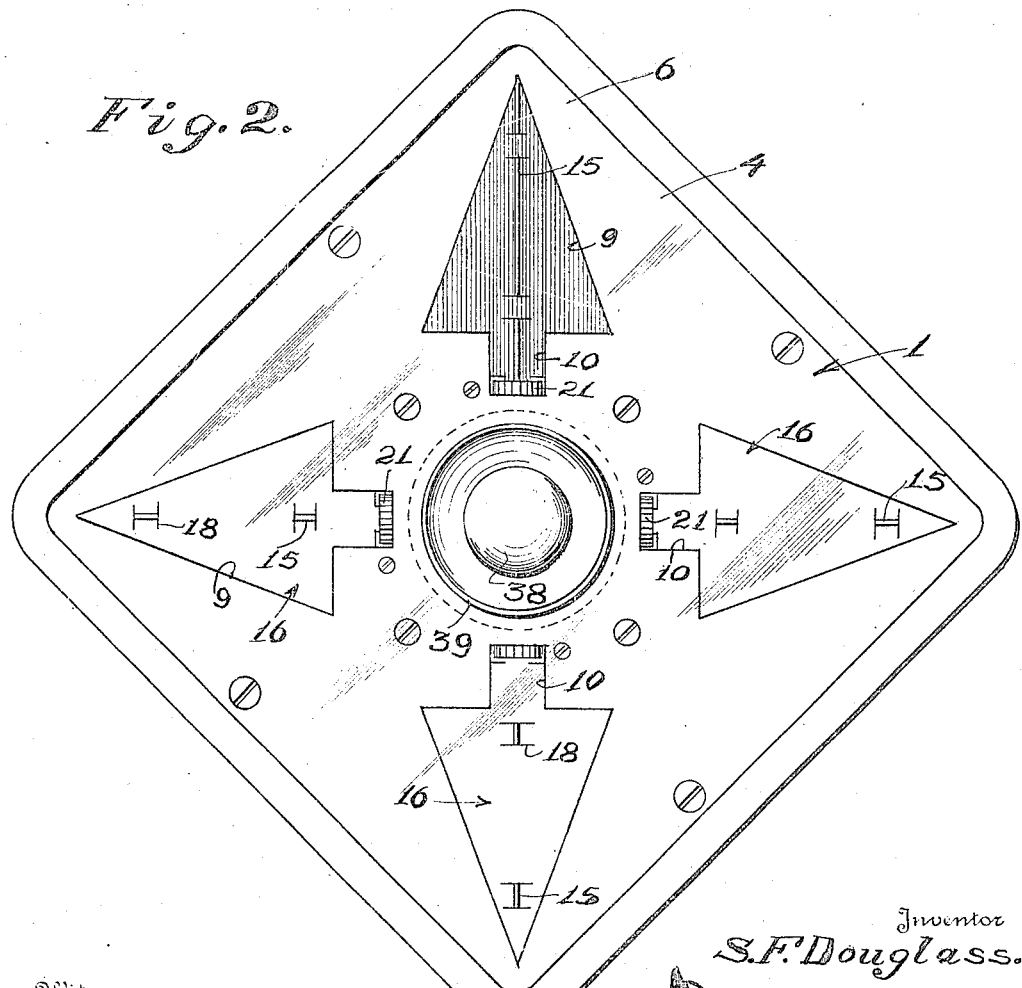

Figure 1 is a side view in elevation, partly broken away to more clearly illustrate the details of construction of a motor vehicle showing this improved indicator attached thereto. Fig. 2 is a face view of the indicator. Fig. 3 is a bottom plan view of the indicator plate illustrating the solenoids and operating mechanism for the pointers. Fig. 4 is a sectional view on line 4—4 of Fig. 3. Fig. 5 is a side view in elevation of an indicator constructed in accordance with this invention. Fig. 6 is a fragmentary sectional view through a portion of the casing. Fig. 7 is a detail view of one of the switches, and Fig. 8 is the wiring diagram of the device.

Referring now to the drawings by characters of reference the numeral 1 designates as an entirety, the casing of the device comprising the bottom wall 2 having a side and end wall 3 formed integral therewith. The bottom is preferably square in plan and there is provided the cover 4 comprising the glass panel 5 secured in the frame 6, which is attached in any preferred manner to the upper edges of the wall 3. Secured within the casing 1 and spaced from the bottom wall 2 is a suitable plate designated generally by the numeral 7 which comprises the body 8, having formed therein the tapered openings 9 which are arranged so that the points of convergent of the walls point directly to the corners of the casing as clearly shown in Figs. 2 and 3. These openings 9 are triangular and they communicate with the slots 10 formed in the plate which extend toward the central opening 11'.

Secured intermediate the plate 8 and the bottom wall 2 of the casing and located adjacent the under side of the plate are the solenoids 11, having slidable therein, the armatures 12 which are provided at their outer ends with the rack bars 13 which bars are provided with a series of openings extending longitudinally, forming teeth which mesh with the gears operating the signals as will be more fully hereinafter described.

Secured in each corner of the under sides of the plate are the brackets 14 having journaled therein the shafts 15 carrying the indicator arrows 16. These arrows 16 comprise triangular bodies having formed near each end, a pair of slits forming the shaft engaging portions 18 which coöperate with the bodies in holding the shaft in proper position with relation thereto. The inner ends of the shafts are journaled in downturned portions 19 formed at the extreme inner ends of the slots 10 and extend slightly beyond the said downturned portions and are surrounded with suitable coil springs 20 which are secured to the shafts and downturned portions so as to normally hold the indicator arrows 16 in a predetermined position. The faces of the arrows which are normally exposed are preferably painted white or of the color of the plate 7 while the under faces are preferably red or a similar bright color which may be readily seen. Mounted on the shaft adjacent the downturned portion 19 are the gear wheels or pinions 21 which mesh with the teeth of the rack bars 13 so that as the solenoids are energized, the armatures will move the rack bars and thereby cause the rotation of the indicator arrows.

The switch used in connection with applicant's device is best illustrated in Fig. 7 and comprises the casing 22 having secured therein, suitable insulating material 23. This insulating material is provided with a V-shaped recess 24, in which the lever 25 is pivotally mounted. This lever 25 is provided with a pair of oppositely disposed contact plates 26 and 27, which plates are arranged to engage respectively two separate sets of contacts designated by the numerals 28 and 29 as clearly shown in Fig. 7. There are provided two of these switches and one of them is mounted on one side of the steering wheel, while the opposite switch is mounted on the opposite side of the steering wheel. Suitable wires are connected to the switches and to the indicators as well as the power source and it will thus be seen that the manipulation of the switches will cause the different indicator arrows to be thrown into and out of operative position.

Upon referring to the diagram in Fig. 8, it is apparent that there is provided the power source 30 from one pole of which leads a suitable wire 31, which wire 31 is the general return wire and is connected to each of the magnets as clearly illustrated in the drawing. In the wiring diagram the switches for operating the indicators pointing to show whether the car is going to the front or rear will be referred to by the reference character $b$, while the switch indicating a turn will be referred to by the reference character $a$. Upon throwing the switch $a$ to indicate a left hand turn, it will be apparent that the current will flow from the power source through the wire 32 into the wire 33 which leads to the contact 34 of the switch. This contact 34 is engaged by one of the plates 26 or 27, which contact also engages the contact 35, thus allowing the current to flow through the plates and into the wire 36 from whence it passes into the solenoid $a'$. The current then passes back from the solenoid $a'$ to the power source through the wire 31 and it will thus be seen that the solenoid will become energized, thereby exerting pull on its armature and throwing the signal to indicate the left hand turn. Simultaneously with the energization of the magnet $a'$, the magnet $a''$ will be energized as it is on the same circuit.

It will thus be seen that whichever switch is thrown two of the magnets will become energized, thereby operating their respective signals and indicating at both ends of the vehicle, the direction to be taken.

Mounted within the casing is a suitable lamp base 37 and this base is located centrally of the plates so that the opening therein alines with the opening in the plate 8. A suitable lamp bulb 38 is threaded into the base 37 and surrounding the bulb is a suitable reflector 39 which is designed to throw the rays away from the bulb. In order that the rear signal may be used in place of the usual tail lamp, the glass panel 5 is coated with a suitable red material, which will cause the light rays passing therethrough to be colored. On the front indicator of course, the red spot in the center is eliminated as there is no necessity for carrying such a single lamp.

From the foregoing it will be apparent that the user of such a device may readily signal pedestrians and others that he intends to turn a corner or is coming to a stop or will proceed ahead without necessarily removing his hands from the steering wheel of the vehicle. It is also apparent that a signal which is equally visible after night as well as in the day time, is provided.

While in the foregoing there has been shown and described the preferred embodiment of this invention, it is to be understood that such changes may be made in the combination and arrangement of parts as will fall within the spirit and scope of the appended claims.

What is claimed is:—

1. A device of the class described including a casing, a plate within the casing, the plate being provided with a plurality of triangular openings, triangular signals, shafts supporting said signals, spur gears on the shafts, rack bars slidable beneath the plate, solenoids supported on the under side of the plate, armatures slidable in the solenoids and connected to the rack bars so that when the solenoids are energized the signals will be moved and means for illuminating the casing.

2. A direction indicator of the character described including a casing, a transparent front wall for said casing, a plate within the casing, said plate being provided with a plurality of radially disposed triangular openings, indicators closing said opening, the opposite sides of the indicator being different colors so that when the indicators are in their indicating positions, the colors will be exposed and means to reverse the position of the indicator.

3. In a direction indicator, a plate, said plate being provided with a central opening and having a plurality of radially disposed triangular openings arranged around the central opening, signals shaped to fit the openings, said signals being of the same color as the plate when in their inoperative position, the under faces of said signals being of a color other than that of the plate, and electrically controlled means for reversing the position of each indicator selectively.

In testimony whereof I affix my signature in presence of two witnesses.

SAMUEL F. DOUGLASS.

Witnesses:
 A. E. PALMIER, Jr.,
 GEO. A. REIFEL.